United States Patent
Motakef et al.

(10) Patent No.: US 9,897,003 B2
(45) Date of Patent: Feb. 20, 2018

(54) APPARATUS AND METHOD OF OPERATING A TURBINE ASSEMBLY

(71) Applicant: General Electric Company, Schenectady, NY (US)

(72) Inventors: Abbas Motakef, Johns Creek, GA (US); Julio Enrique Mestroni, Marietta, GA (US)

(73) Assignee: General Electric Company, Schenectady, NY (US)

( * ) Notice: Subject to any disclaimer, the term of this patent is extended or adjusted under 35 U.S.C. 154(b) by 931 days.

(21) Appl. No.: 13/632,186

(22) Filed: Oct. 1, 2012

(65) Prior Publication Data

US 2014/0093351 A1 Apr. 3, 2014

(51) Int. Cl.
*F02C 7/057* (2006.01)
*F02C 7/143* (2006.01)

(52) U.S. Cl.
CPC .............. *F02C 7/057* (2013.01); *F02C 7/143* (2013.01)

(58) Field of Classification Search
CPC .......... F02C 7/141; F02C 7/143; F02C 7/185; F02C 7/047; F02C 7/057; F05D 2260/213; F05D 2270/303; F05D 2270/313; F01D 25/08; F01D 25/10; F01D 25/12
See application file for complete search history.

(56) References Cited

U.S. PATENT DOCUMENTS

| | | | | |
|---|---|---|---|---|
| 4,418,527 | A * | 12/1983 | Schlom | F01K 21/047 60/39.53 |
| 5,083,423 | A * | 1/1992 | Prochaska et al. | 60/772 |
| 6,109,339 | A * | 8/2000 | Talbert et al. | 165/48.1 |
| 6,216,443 | B1 * | 4/2001 | Utamura | 60/39.53 |
| 7,644,573 | B2 | 1/2010 | Smith et al. | |
| 7,648,564 | B2 | 1/2010 | Chillar et al. | |
| 7,963,095 | B2 * | 6/2011 | Chillar | F02C 7/04 165/100 |
| 2007/0294984 | A1 * | 12/2007 | Chillar et al. | 55/314 |
| 2010/0101209 | A1 * | 4/2010 | Feher et al. | 60/266 |
| 2010/0175558 | A1 * | 7/2010 | Raje et al. | 96/189 |
| 2010/0319384 | A1 * | 12/2010 | Zhang | F01D 25/007 62/271 |
| 2011/0083419 | A1 * | 4/2011 | Upadhyay et al. | 60/264 |

* cited by examiner

*Primary Examiner* — Justin Seabe
*Assistant Examiner* — Juan G Flores
(74) *Attorney, Agent, or Firm* — Armstrong Teasdale LLP

(57) ABSTRACT

A method of operating a turbine assembly is provided. The method includes receiving a flow of air at a filter house that includes a first heat exchanger. The temperature of the air is controlled with the first heat exchanger by one of selectively cooling the air and by selectively heating the air. The air is then channeled from the first heat exchanger to a second heat exchanger to facilitate cooling the air.

9 Claims, 3 Drawing Sheets

US 9,897,003 B2

APPARATUS AND METHOD OF OPERATING A TURBINE ASSEMBLY

BACKGROUND OF THE INVENTION

The field of the present disclosure relates generally to turbine assemblies and, more specifically, to a system and method for use in controlling the temperature of compressor intake air of a gas turbine to facilitate improving power output and/or efficiency of the turbine.

Rotary machines, such as gas turbines, are often used to generate power for electric generators. Gas turbines, for example, have a working fluid path which typically includes, in serial-flow relationship, an air intake, a compressor, a combustor, a turbine, and a gas outlet. Compressor and turbine sections include at least one row of circumferentially-spaced rotating buckets or blades positioned within a housing. At least some known turbine engines are used in cogeneration facilities and power plants.

Generally, gas turbines use intake air during normal operation for combustion purposes. Intake air is drawn through a filter house and towards the compressor, wherein the compressor-discharge air is mixed with fuel and ignited in the combustor. Because gas turbines are constant volume, air-breathing engines, many factors and characteristics of intake air, such as the temperature, pressure, and/or humidity of the intake air, may affect the power output and overall efficiency of a gas turbine system. For example, when the temperature of intake air is low, its density increases resulting in a higher mass flow rate flowing through the gas turbine. During such operating conditions, the power output and overall efficiency of the turbine engine is increased.

At least some known turbine assemblies use either evaporative cooling or a cooling coil to reduce the temperature of air being channeled towards the compressor. Evaporative cooling reduces the temperature of air through the evaporation of water and heat is transferred between a working fluid flowing through cooling coils and the intake air. However, the effectiveness of evaporative cooling is a function of the humidity of the ambient air and its effectiveness may be substantially reduced in climates having a high relative humidity. Furthermore, if the cooling coils are installed upstream from the air filters and the intake air is cooled below its dew point, the saturated air mixes with particulates in the intake air. The saturated air and particulate mixture may plug the air filters and trip the gas turbine due to the large pressure drop caused by the plugged filters.

BRIEF DESCRIPTION OF THE INVENTION

In one aspect, a method of operating a turbine assembly is provided. The method includes receiving a flow of air at a filter house that includes a first heat exchanger. The temperature of the air is controlled with the first heat exchanger by one of selectively cooling the air and by selectively heating the air. The air is then channeled from the first heat exchanger to a second heat exchanger to facilitate cooling the air.

In another aspect, an apparatus for use with a turbine assembly is provided. The apparatus includes a first heat exchanger and a second heat exchanger. The first heat exchanger is configured to control the temperature of air flowing into the turbine assembly by cooling the air when the first heat exchanger is in a first operational mode and by heating the air when the first heat exchanger is in a second operational mode. The second heat exchanger is coupled downstream from the first heat exchanger and is configured to cool the air channeled from the first heat exchanger.

In yet another aspect, a gas turbine assembly is provided. The gas turbine assembly includes a first filter house and a second filter house positioned downstream from the first filter house. The first filter house includes a first heat exchanger configured to control a temperature of air channeled therethrough by cooling the air when the first heat exchanger is in a first operational mode and by heating the air when the first heat exchanger is in a second operational mode. The second filter house includes a second heat exchanger configured to cool the air channeled from the first heat exchanger.

DETAILED DESCRIPTION OF THE INVENTION

Figure 1:
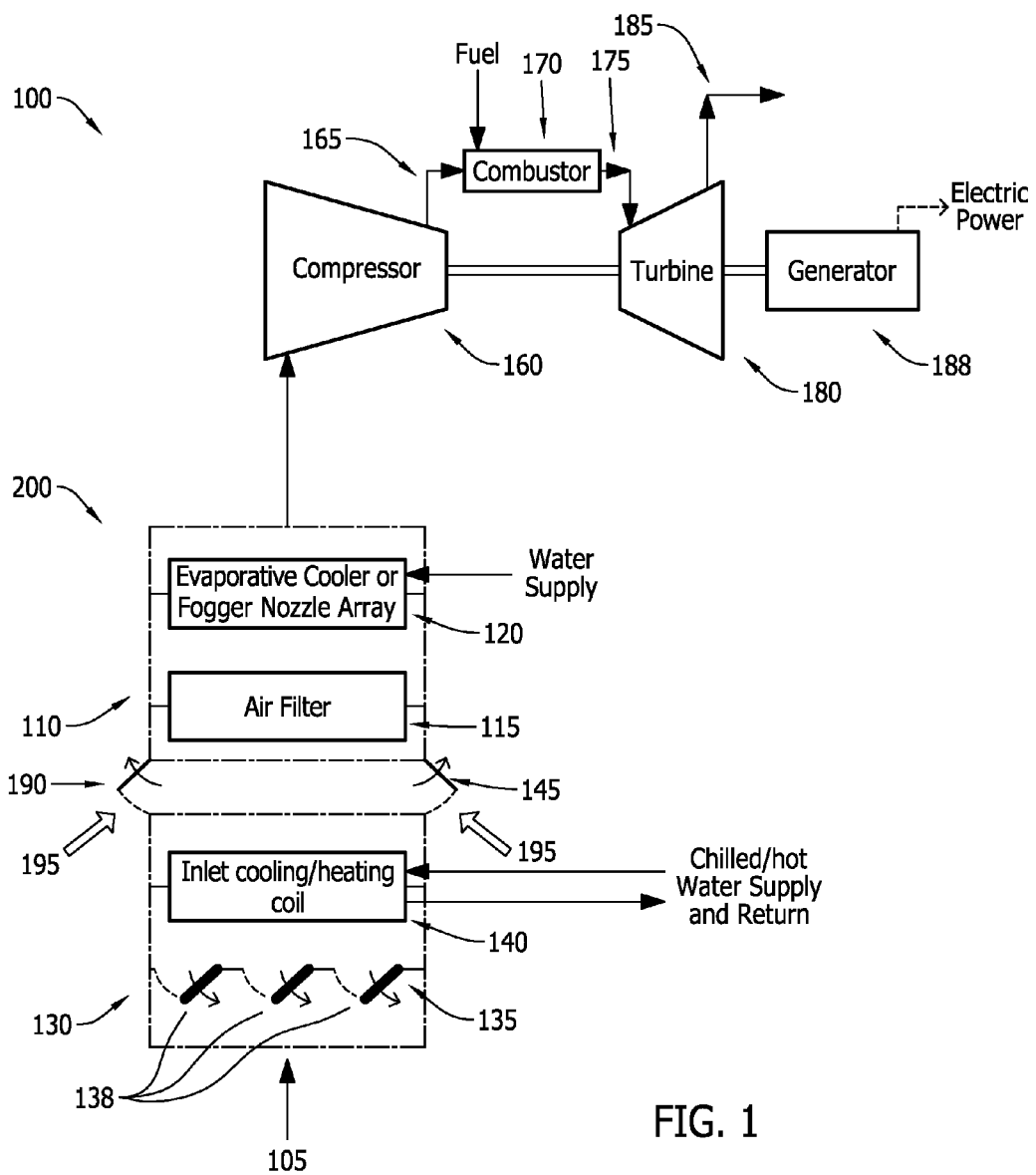
FIG. 1 is a schematic diagram of an exemplary gas turbine power system.

Embodiments of the present disclosure are directed to turbine assemblies and, more specifically to a method and apparatus for use in controlling the temperature of intake air for use with a turbine assembly. Even more specifically, embodiments of the present disclosure are directed to a heat exchanger that may be used in combination with an evaporative cooler to facilitate controlling the temperature of compressor intake air. In one embodiment, the heat exchanger includes an inlet cooling/heating coil upstream from the evaporative cooler to supplement intake air cooling during hot days, to heat intake air during partial-load operation of the gas turbine, and to facilitate preventing ice build-up in a filter house and compressor during cold days. More specifically, in the exemplary embodiment, the heat exchanger is positioned upstream from the existing filter house such that the heat exchanger may be installed, i.e. retrofitted, as a new extension to the existing filter house without requiring that the gas turbine be shut down and existing evaporative cooler in the filter house be replaced.

As described in 1988 ASME published article "The Theory and operation of Evaporative Coolers for Industrial Gas Turbine Installation" by R. S. Johnson, the wet-bulb (WB) temperature of intake air limits the cooling capability of an evaporative cooler. Evaporative cooling is an adiabatic process in that heat must be added to evaporate water. During evaporative cooling, the intake air supplies heat to the water thereby lowering the dry-bulb (DB) temperature of air, i.e. sensible cooling. As the DB temperature of the intake air is reduced, the WB temperature remains constant. Accordingly, the maximum reduction in DB temperature is the difference between the DB and WB temperatures of the intake air. If air is cooled to the WB temperature, it becomes saturated and the process would be 100% effective, which may only be achieved theoretically. The effectiveness is defined as the difference between DB temperatures of the air entering and leaving an evaporative cooler divided by the difference between DB and WB temperatures of the air that enters the evaporative cooler. Typically, the effectiveness of evaporative coolers is between 80 to 95% depending on the evaporative cooler structure and configuration. Since the DB and WB temperatures of intake air are continuously changing during the day, the power output of the gas turbine varies accordingly.

In the exemplary embodiment, the coils are installed within the flow path of the compressor intake air and supplied with fluids such that heat is transferred between the fluid flowing through the coils and the intake air. The working fluid may be water, a mixture of water and antifreeze, or a refrigerant. As such, the coils may be used to maintain a substantially constant temperature of the intake air supplied to the compressor such that the power output of the gas turbine likewise remains substantially constant regardless of ambient air conditions. Accordingly, plant operators are provided with a valuable commercial advantage by enabling the gas turbine power output to be controlled with a high degree of certainty. When compressor inlet air is cooled to about 45° F. or about 50° F., which is generally below the intake air dew point, the power output of the gas turbine is optimized on warm days. In such an embodiment, saturated air having a humidity ratio of at least 98% contains airborne condensates. A moisture separator or drift eliminator may be installed downstream from the cooling coils to remove airborne water droplets from the intake air to facilitate preventing damage to compressor blades.

Generally, an already installed evaporative cooler may be replaced with a cooling coil to lower the compressor inlet air temperature beyond the capacity of known evaporative coolers. Such a replacement is costly as it requires one to two weeks of gas turbine outage, demolition of the evaporative cooler, and modification of the air intake apparatus to accommodate the new cooling coil. As such, the combination of the cooling/heating coil and the evaporative cooler facilitates compensating for cooling capacity limitations of known evaporative coolers and to facilitate obtaining substantially constant lower compressor inlet air temperature for higher power output and efficiency in a gas turbine.

FIG. 1 is a schematic diagram of an exemplary gas turbine power system 100. In the exemplary embodiment, gas turbine power system 100 includes, in serial-flow relationship, a filtration system 200, an axial flow compressor 160, a combustor 170, and a gas turbine 180. Intake air 105 is filtered in filtration system 200 and is directed to axial flow compressor 160. Intake air 105 is at ambient air temperature. Compressed air 165 is directed to combustor 170 where fuel is injected with compressed air 165 for combustion purposes. Hot gas 175 is discharged from combustor 170 and is directed to gas turbine 180 where the thermal energy of hot gas 175 is converted to work. A portion of the work is used to drive compressor 160, and the balance is used to drive an electric generator 188 to generate electric power. Hot exhaust gas mixture 185 is discharged from gas turbine 180 and channeled to either the atmosphere or to a Heat Recovery Steam Generator (HRSG) (not shown).

Figure 2:
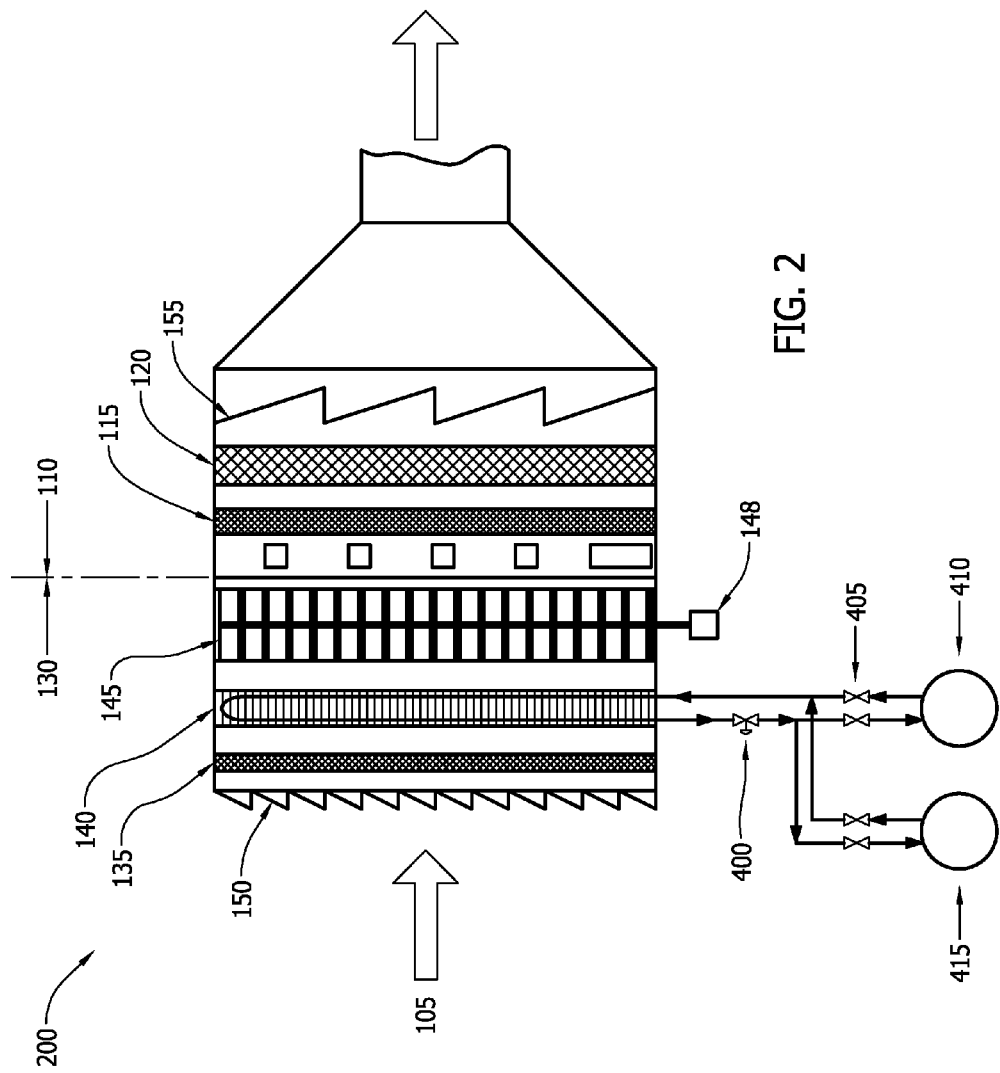
FIG. 2 is a schematic view of an exemplary filtration system that may be used with the power system shown in FIG. 1.

FIG. 2 is a schematic view of filtration system 200 that may be used with gas turbine power system 100. In the exemplary embodiment, filtration system 200 includes a filter house extension 130, an existing filter house 110 positioned downstream from filter house extension 130, and a bypass system 190 positioned therebetween. More specifically, filter house extension 130 is constructed and spaced from existing filter house 110 such that the construction of filter house extension 130 does not adversely affect the operation of gas turbine 180. In the exemplary embodiment, filter house extension 130 includes a weather hood 150, a pre-filter 135, and an inlet air cooling/heating coil 140. Existing filter house 110 includes a filter 115, an evaporative cooler or fogger 120, and a drift eliminator 155. Bypass system 190 includes a bypass louver 145 coupled to a bypass actuator 148 for selectively opening and closing bypass louver 145.

During operation, intake air 105 is directed through pre-filter 135, inlet air cooling/heating coil 140, air filter 115, and evaporative cooler or fogger 120 before being directed to compressor 160 (shown in FIG. 1). Airborne particles contained within intake air 105 are removed by pre-filter 135 to facilitate preventing fouling of inlet cooling/heating coil 140. Moreover, intake air 105 is directed towards coil 140 at one temperature and is discharged from coil 140 at another temperature.

In the exemplary embodiment, inlet cooling/heating coil 140 either cools intake air 105 when in a first operational mode or heats intake air 105 when in a second operational mode. For example, when there is a need to increase power output and operational efficiency of gas turbine 180 in base-load operation, inlet cooling/heating coil 140 is supplied with chilled working fluid from a chilled water source 410 to facilitate reducing the temperature of intake air 105. Furthermore, for example, when there is a need to facilitate improving operational efficiency of gas turbine 180 at partial-load operation or there is a potential for ice build-up on filter house elements or a compressor airfoil (not shown), cooling/heating coil 140 is supplied with hot working fluid from a hot water source 415. Such ice build-up may occur when the ambient air temperature is low or when the difference between the ambient air temperature and dew point is less than 10° F.

In the exemplary embodiment, a control valve 400 is used to control the flow of fluid through inlet cooling/heating coil 140 and isolation valves 405 are used to selectively supply cooling/heating fluid to inlet cooling/heating coil 140. As such, chilled water source 410 is used to control the wet bulb (WB) temperature and/or humidity of intake air 105 downstream of coil 140, and/or used to supplement the cooling effect of evaporative cooler 120 during the first operational mode. Hot water source 415 is used to control the dry bulb (DB) temperature of intake air 105 downstream of coil 140 during the second operational mode with heating and/or anti-icing operation. Furthermore, it may be undesirable to enable the humidity of the intake air to exceed 75% during the first operational cooling mode, and for the DB temperature to exceed 120° F. during the second operational heating mode.

When intake air 105 is channeled through filter house extension 130, a drop in pressure of intake air 105 may occur. In one embodiment, the pressure drop may be between 0.75 to 1.5 inches, where the pressure drop is measured in inches of water column. Intake air pressure drop upstream of compressor 160 may reduce the power output and efficiency of gas turbine 180 (shown in FIG. 1). For example, a pressure drop of about 1.0 inches of water across filter house extension 130 may result in about a 2 megawatt (MW) loss in power output of gas turbine 180. Accordingly, in some embodiments, and during certain operating conditions, it may be undesirable to use coil 140 for supplemental cooling or heating of intake air 105 flowing therethrough. For example, the temperature and relative humidity of intake air 105 may be substantially optimal to produce an optimum output at base load or optimum efficiency at partial load of gas turbine 180, thereby making the use of the coil 140 unnecessary. As such, in the exemplary embodiment, bypass actuator 148 engages bypass louver 145 such that bypass air 195 circumvents filter house extension 130 to avoid gas turbine power output and efficiency penalties caused by intake air 105 pressure drop across weather hood 150, pre-filter 135, and coil 140.

In the exemplary embodiment, drift eliminator 155 facilitates preventing damage and corrosion to compressor 160. Water carry-over is the presence of water droplets in the air discharged from evaporative cooler 120. Ingestion of such water droplets into compressor 160 may cause damage to compressor moving blades (not shown) and corrosion to other compressor parts. As such, in the exemplary embodiment, vane-type drift eliminator 155 is installed downstream of evaporative cooler 120 to facilitate preventing water carry-over into compressor 160.

In the exemplary embodiment, weather hood 150 facilitates preventing inclement weather such as rain, snow, and large airborne particles to enter filtration system 200. In one embodiment, weather hood 150 may include a plurality of coalescent pads (not shown) to prevent the ingestion of water droplets and snow flakes into filtration system 200. During installation, weather hood 150 is removed from existing filter house 110 and retrofitted onto filter house extension 130. To reduce costs, in an alternative embodiment, filter house extension 130 may exclude pre-filter 135 for select plant locations where the concentration of airborne particles is comparatively low such that the potential for cooling/heating coil fouling is facilitated to be reduced.

As described above, when the ambient air temperature is low, ice build-up may accumulate on pre-filter 135. Such ice build-up may clog pre-filter 135 and result in the shut down of gas turbine 180. Accordingly, in the exemplary embodiment, pre-filter 135 is installed on a swinging panel 138 that may be selectively and temporarily moved during certain operating conditions to enable intake air 105 to bypass pre-filter 135. For example, to facilitate preventing ice build-up on pre-filter 135, swinging panel 138 moves such that intake air 105 is channeled directly towards inlet cooling/heating coil 140. Temporarily bypassing pre-filter 135 may not cause damage to inlet cooling/heating coil 140 and compressor 160 because fouling of coil 140 generally occurs during long operation, and compressor 160 is protected against the presence of airborne particulates by air filter 115. More specifically, in the exemplary embodiment, air filter 115 removes particulates having a size of up to approximately 3μ (microns) from intake air 105.

Figure 3:
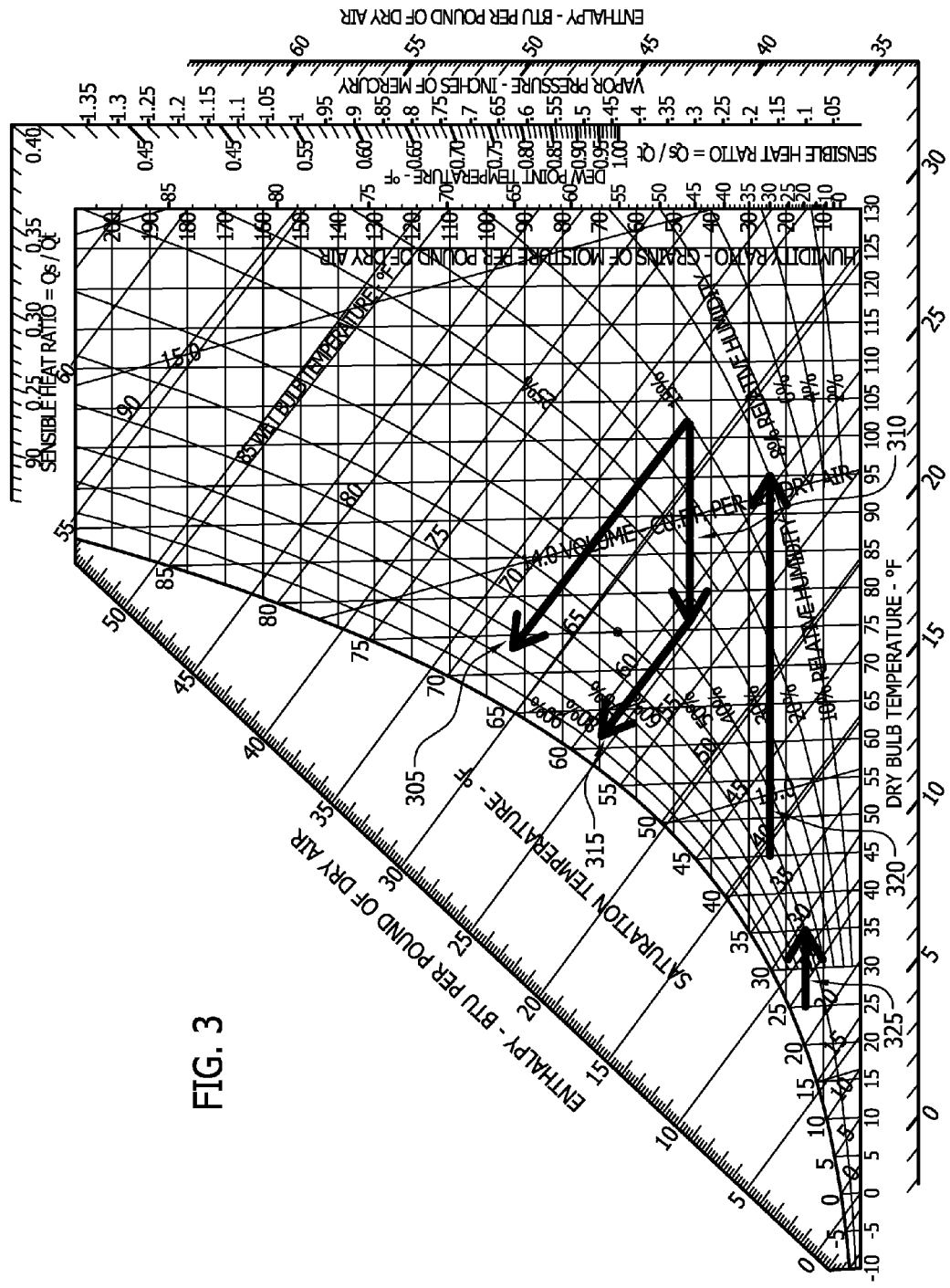
FIG. 3 is an exemplary psychrometric diagram of air flowing through the filtration system shown in FIG. 2.

FIG. 3 is an exemplary psychrometric diagram of intake air 105 flowing through filter house extension 130 and existing filter house 110 (shown in FIG. 2). In the exemplary embodiment, intake air 105 has a dry bulb (DB) temperature of about 105° F., wet bulb (WB) temperature of about 68° F. and a relative humidity of about 15%. In the exemplary embodiment, when only evaporative cooling from evaporative cooler 120 (shown in FIG. 2) with about 85% effectiveness is used, the temperature of intake air 105 is reduced by about 31.75° F. while the WB temperature remains substantially constant along path 305.

When coil 140 is in the first operational mode, both inlet chilling from inlet cooling/heating coil 140 (shown in FIG. 2) and evaporative cooling from evaporative cooler 120 are used to facilitate cooling intake air 105 channeled through filter house extension 130 and existing filter house 110. More specifically, in the exemplary embodiment, inlet chilling along path 310 cools intake air 105 from about 105° F. to about 73.25° F. by extracting heat therefrom. As such, the relative humidity of intake air 105 is increased by at least 15%, and more specifically from about 15% to about 40%, and the wet bulb temperature of intake air 105 is facilitated to be reduced from about 68° F. to about 57° F. while the air humidity ratio remains substantially constant. When heat is extracted from intake air 105 with inlet chilling along path 310, the relative humidity of intake air 105 may not exceed 75% and the temperature of intake air 105 should remain above its dew point such that the generation of condensation within coil 140 is substantially eliminated. In the exemplary embodiment, evaporative cooling along path 315 with evaporative cooler 120 is then used to provide additional cooling of intake air 105 to about 62° F.

Furthermore, when coil 140 is in the second heating operational mode, inlet heating along path 320 with coil 140 is used to raise intake air 105 temperature. More specifically, in the exemplary embodiment, intake air 105 has a dry bulb temperature that is raised from about 45° F. to about 95° F. while the air humidity ratio remains substantially constant along path 320 to facilitate increasing turbine efficiency during partial-load operation. In another embodiment, the temperature of intake air 105 is raised from about 25° F. to about 35° F. along path 325 to facilitate preventing ice build-up in filter houses 110 and 130 and compressor 160 (shown in FIG. 1) during base-load operation. In some embodiments, the temperature rise of intake air 105 may be limited to about 10° F. above its dew point to facilitate preventing ice build-up and to facilitate optimizing the power output of gas turbine power system 100.

The filter house described herein facilitates increasing the power output of a turbine assembly by controlling the temperature of intake air. More specifically, the filter house uses a cooling/heating coil and an evaporative cooler in combination to control the temperature of intake air. The cooling/heating coil is positioned upstream from an existing evaporative cooler to supplement the evaporative cooler temperature control. For example, during hot days, the cooling/heating coil facilitates cooling the intake air prior to it entering the turbine assembly. During cold days, the cooling/heating coil heats the intake air to facilitate preventing ice build-up in the filter house and/or increase turbine efficiency during partial-load operation. Furthermore, installation of the filter house extension upstream from the existing filter house facilitates substantially eliminating the need for the gas turbine to be shut down and evaporative cooler in the existing filter house be replaced. As such, turbine output is increased and installation outages are substantially eliminated thereby optimizing the cost and efficiency of the turbine assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a turbine assembly, the turbine assembly including a bypass intake coupled between a filter house extension and a filter house, said method comprising:
receiving a first flow of air at the filter house extension, wherein the filter house extension routes the first flow of air through a first filter and a first heat exchanger, and wherein the first heat exchanger is selectively operable to cool the first flow of air in a first operational mode and to heat the first flow of air in a second operational mode;

selectively moving the bypass intake between a closed position wherein solely the first flow of air is received by the filter house, and an open position wherein the filter house receives ambient bypass air through the bypass intake;

controlling at least one valve coupled to the first heat exchanger such that, in the first operational mode, the first heat exchanger decreases a wet bulb temperature of the first flow of air and increases a relative humidity of the first flow air to not greater than about 75 percent;

cooling the air received by the filter house via an evaporative cooler; and channeling the air received by the filter house through a drift eliminator coupled downstream from the evaporative cooler, such that the drift eliminator removes substantially all water droplets from the air.

2. The method of claim 1, further comprising at least one of:

cooling the air with the first heat exchanger to facilitate reducing the wet bulb temperature of the air while the air humidity ratio remains substantially constant in the first operational mode; and heating the air with the first heat exchanger to facilitate increasing a dry bulb temperature of the air while the air humidity ratio remains substantially constant in the second operational mode.

3. The method of claim 1, further comprising heating the air with the first heat exchanger in the second operational mode to facilitate preventing ice build-up on a filter house element.

4. The method of claim 1, further comprising heating the air with the first heat exchanger in the second operational mode to facilitate improving turbine efficiency during partial-load operation.

5. The method of claim 1 further comprising filtering the air with a second filter positioned upstream from the evaporative cooler.

6. The method of claim 1, further comprising moving the bypass intake to the open position to facilitate preventing turbine efficiency penalties caused by pressure drop across the first heat exchanger.

7. The method of claim 1, wherein the first heat exchanger includes a coil configured to receive a flow of fluid therethrough, and wherein controlling the at least one valve comprises controlling the flow of fluid through the coil to control the relative humidity of the first flow of air.

8. The method of claim 1, further comprising controlling the at least one valve in the first operational mode such that the first heat exchanger decreases the wet bulb temperature of the first flow of air from a first value to a second value, and further cooling the first flow of air to a temperature below the first value in the evaporative cooler.

9. The method of claim 1, further comprising routing the air received by the filter house through a second filter upstream from the evaporative cooler, the second filter configured to remove particulates having a size larger than 3 microns from the air received by the filter house.

* * * * *

UNITED STATES PATENT AND TRADEMARK OFFICE
CERTIFICATE OF CORRECTION

PATENT NO. : 9,897,003 B2
APPLICATION NO. : 13/632186
DATED : February 20, 2018
INVENTOR(S) : Motakef et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this
First Day of May, 2018

Andrei Iancu
*Director of the United States Patent and Trademark Office*